United States Patent
Lancaster-Larocque et al.

(10) Patent No.: US 10,336,031 B2
(45) Date of Patent: Jul. 2, 2019

(54) IN-PROCESS POLYURETHANE EDGE COATING OF LASER CUT POLYURETHANE LAMINATED FABRIC

(71) Applicant: Apple Inc., Cupertino, CA (US)

(72) Inventors: Simon Regis Louis Lancaster-Larocque, Gloucester (CA); Bradley J. Nielson, Santa Clara, CA (US); Jacob S. Kononiuk, Allenford (CA)

(73) Assignee: Apple Inc., Cupertino, CA (US)

( * ) Notice: Subject to any disclaimer, the term of this patent is extended or adjusted under 35 U.S.C. 154(b) by 487 days.

(21) Appl. No.: 15/006,446

(22) Filed: Jan. 26, 2016

(65) Prior Publication Data

US 2017/0087803 A1    Mar. 30, 2017

Related U.S. Application Data

(60) Provisional application No. 62/233,525, filed on Sep. 28, 2015.

(51) Int. Cl.
| | |
|---|---|
| *B32B 3/02* | (2006.01) |
| *B32B 5/02* | (2006.01) |
| *B32B 27/12* | (2006.01) |
| *B32B 27/40* | (2006.01) |
| *B32B 27/38* | (2006.01) |
| *B32B 27/36* | (2006.01) |
| *B32B 27/28* | (2006.01) |
| *B32B 38/00* | (2006.01) |

(52) U.S. Cl.
CPC ............ *B32B 5/02* (2013.01); *B32B 3/02* (2013.01); *B32B 27/12* (2013.01); *B32B 27/281* (2013.01); *B32B 27/36* (2013.01); *B32B 27/38* (2013.01); *B32B 27/40* (2013.01); *B32B 38/0004* (2013.01); *B32B 38/105* (2013.01); *B32B 2262/02* (2013.01); *B32B 2262/101* (2013.01); *B32B 2262/106* (2013.01); *B32B 2305/18* (2013.01); *B32B 2310/0843* (2013.01)

(58) Field of Classification Search
CPC ........ B32B 2305/18; B32B 2310/0843; B32B 38/0004; B32B 38/105; B32B 3/02; B32B 5/02; B32B 5/26; B32B 2262/101; B32B 2262/106; B32B 2262/02; B32B 27/12; B32B 27/40; B32B 27/38; B32B 27/36; B32B 27/281
USPC ......................... 156/272.8, 73.3; 428/292.1
See application file for complete search history.

(56) References Cited

U.S. PATENT DOCUMENTS

| | | | |
|---|---|---|---|
| 4,776,904 A * | 10/1988 | Charlton | ............. B32B 27/10 156/73.1 |
| 5,614,115 A | 3/1997 | Horton et al. | |
| 6,694,528 B1 | 2/2004 | Chang | |
| 2010/0083534 A1 | 4/2010 | Howlett | |

* cited by examiner

*Primary Examiner* — Camie S Thompson
(74) *Attorney, Agent, or Firm* — David K. Cole

(57) ABSTRACT

Processes for forming cosmetically appealing edges on laminated fabric structures are described. The methods involve a laser cutting process that includes in-process melting of polymer material within the laminated fabric so as to coat fibers of the laminated fabric. The resultant cut laminated fabric has a cosmetic edge that has no exposed fibers. The laser cutting and melting can be performed in a single laser cutting operation, making it well suited for integration into manufacturing product lines.

13 Claims, 5 Drawing Sheets

IN-PROCESS POLYURETHANE EDGE COATING OF LASER CUT POLYURETHANE LAMINATED FABRIC

CROSS-REFERENCE TO RELATED APPLICATIONS

This application claims the benefit of priority under 35 U.S.C § 119(e) to U.S. Provisional Application No. 62/233,525, entitled "IN-PROCESS POLYURETHANE EDGE COATING OF LASER CUT POLYURETHANE LAMINATED FABRIC," filed on Sep. 28, 2015, the disclosure of which is incorporated herein by reference in its entirety.

FIELD

The described embodiments relate generally to laminated polymer fabrics. More particularly, the present embodiments relate to cutting laminated polymer fabrics using laser techniques.

BACKGROUND

Polyurethane laminated fabrics are laminated fabrics generally characterized as being flexible and water resistant, and are thus used in a wide range of applications including garments and medical equipment and accessories. The polyurethane laminated fabrics generally include woven fibers or threads of material that give them a flexible and cloth-like feel and movement. One of the manufacturing challenges associated with using polyurethane laminated fabrics as a raw material is that when the laminated fabric is cut, the cut woven fibers or threads can protrude from edges of the laminated fabric, leaving a ragged and cosmetically unappealing edge. In addition, the fibers or threads may be a different color than the polyurethane, exacerbating the cosmetic problem. What are needed therefore are methods for efficiently cutting polyurethane laminated fabrics such that the cut laminated fabric has clean and cosmetically appealing edges.

SUMMARY

This paper describes various embodiments that relate to laser techniques for cutting laminated fabric materials. In particular embodiments, efficient laser cutting techniques for forming cosmetically appealing cut edges on laminated fabrics in a manufacturing setting are described.

According to one embodiment, a method of forming a cosmetic edge on a laminated fabric is described. The laminated fabric includes a polymer layer and a fabric layer. The fabric layer includes fibers. The method includes cutting an edge of the laminated fabric by directing a laser beam at the laminated fabric. During the cutting, the laser beam melts a portion of the polymer layer forming a pool of melted polymer material, wherein the pool of melted polymer material coats the fibers along the edge so as to prevent exposure of the fibers along the edge.

According to another embodiment, a laminated fabric that includes a polymer layer and a fabric layer is described. The fabric layer has fibers. The laminated fabric includes an edge having a coating comprised of a material of the polymer layer. The coating covers a portion of the fibers proximate to the edge so as to prevent exposure of the fibers at the edge.

According to a further embodiment, a method of cutting a laminated fabric is described. The laminated fabric includes a polymer layer and a fabric layer. The method includes impinging a laser beam on the laminated fabric such that the laser beam cuts the laminated fabric. The laser beam locally heats the polymer layer forming a pool of melted material that at least partially coats a cut edge of the fabric layer. The method also includes repeating the impinging until the laser beam cuts through a width of the laminated fabric such that a final cut edge of the laminated fabric has a coating that covers the fabric layer and prevents exposure of the fibers along the final cut edge.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to laminated fabrics, such as polyurethane laminated fabrics. The laminated fabrics can include a polymer layer and a fabric layer that includes a woven network of fibers. The techniques described herein involve the use of lasers so as to cut a laminated fabric while creating a cosmetically appealing cut edge within one laser cutting operation. The methods involve using a laser beam having a high enough energy to cut the laminated fabric but not so high as to pierce through the laminated fabric without melting polymer material of the polymer layer. By cutting the laminated fabric in the same laser operation as melting a polymer material, the melted polymer can coat an edge of the laminated fabric as it is being cut. The laser operation can be tuned such that the melted polymer material flows over and coats edges of the fibers, resulting in a fully coated cosmetic edge that is free from exposed fibers.

In some embodiments, the laser cutting process involves a stepwise process where the laser beam impinges upon the laminated fabric a number of times, gradually cutting and coating the edge with each impingement. This can be accomplished using a pulsed laser beam or by scanning a continuous laser beam over the laminated fabric a number of times. Between each laser interaction, the melted polymer material can partially cool and harden, preventing splatter of the polymer material. The stepwise process can continue until an entire width of the laminated fabric is cut. The laminated fabrics and cutting processes described herein are well suited for implementation in the manufacture of consumer products, such as those manufactured by Apple Inc., based in Cupertino, Calif.

These and other embodiments are discussed below with reference to FIGS. 1-4. However, those skilled in the art will readily appreciate that the detailed description given herein with respect to these Figures is for explanatory purposes only and should not be construed as limiting.

Figure 1:
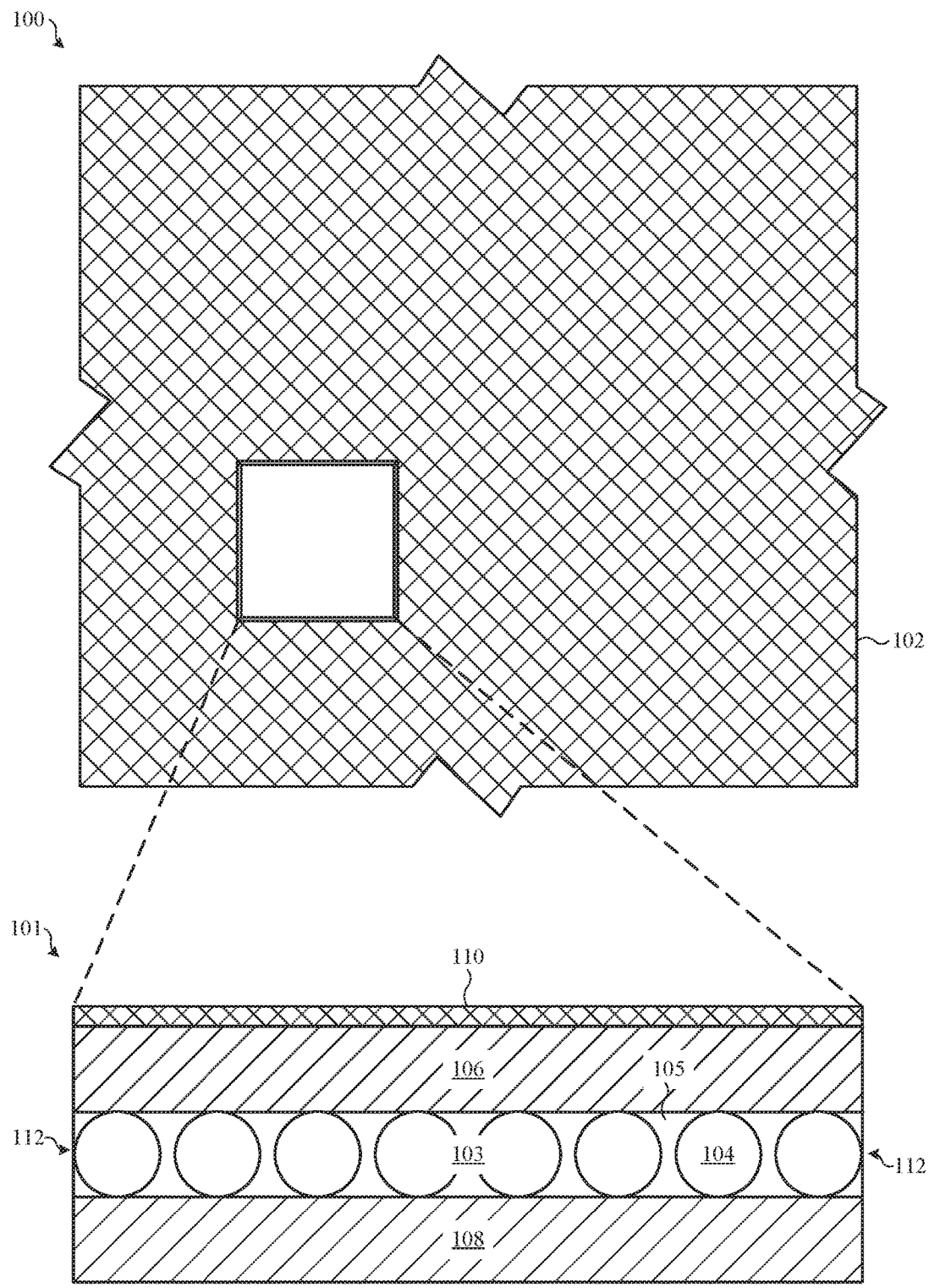
FIG. 1 shows a plan view and a partial cross-section view of laminated fabric.

FIG. 1 shows plan view 100 and partial cross-section view 101 of laminated fabric 102. Laminated fabric 102 can be used to make any of a number of products such as garments, bags, cases, etc. In some embodiments, laminated fabric 102 is designed to be flexible, durable, and at least partially water resistant. In some cases, laminated fabric 102 is used as a material for a cable cover as part of an electronic device, such as described in U.S. provisional Patent Application 62/167,848, which is incorporated herein in its entirety.

Laminated fabric 102 includes fabric layer 103, which has fibers 104 that can be arranged in a woven network. Fibers 104 are optionally embedded within matrix material 105. In some embodiments, fibers 104 are synthetic fibers, such as polymer-based fibers, carbon fibers, or glass fibers. In other embodiments, fibers 104 include natural fibers such as cotton, wool or flax. In some embodiments, fibers 104 include a combination of different types of synthetic fibers and/or natural fibers. The material for fibers 104 can be chosen based on high strength modulus, chemical and thermal stability and other factors. Suitable synthetic polymer fibers 104 can include Vectran® (registered trademark of Kuraray America, Inc.) and Kevlar® (registered trademark of E. I. du Pont de Nemours and Company (a.k.a., DuPont)).

In some embodiments, fibers 104 are embedded within matrix material 105, which can be a thermosetting polymer material. Matrix material 105 can provide structural support for fabric layer 103 within laminated fabric 102. In addition, matrix material 105 can be used to bond fabric layer 103 with surrounding layers. Suitable materials for matrix material 105 can include one or more of polyurethane, epoxy, acrylic, polyester, a polyimide, etc. In some preferred embodiments, matrix material 105 includes polyurethane.

Fabric layer 103 is sandwiched between first polymer layer 106 and second polymer layer 108, which can act as physical and moisture barriers to fabric layer 103. In some cases first polymer layer 106 and second polymer layer 108 are directly bonded to fabric layer 103, while in other cases an adhesive is used to adhere first polymer layer 106 and second polymer layer 108 to fabric layer 103. The materials of first polymer layer 106 and second polymer layer 108 can be chosen based on flexibility and water repelling capability. In some embodiments, one or both of first polymer layer 106 and second polymer layer 108 include one or more thermosetting polymer materials, such as polyurethane, epoxy, acrylic, polyester, a polyimide, etc. In some preferred embodiments, first polymer layer 106 and second polymer layer 108 both include polyurethane.

In some embodiments, laminated fabric 102 includes cosmetic layer 110 that covers first polymer layer 106. Laminated fabric 102 can correspond to an exterior layer that is visible to and/or in direct contact with a consumer. Cosmetic layer 110 can be made of any suitable material and be chosen for qualities such as a desired color, texture, durability, fade resistance, etc. In a particular embodiment, cosmetic layer 110 includes a faux suede material. In some cases more than one cosmetic layer is used. For example a second cosmetic layer (not shown) can cover second polymer layer 108.

One of the problems associated with cutting laminated fabric 102 is that the cutting process can expose fibers 104 such that they can partially unravel and protrude from edges 112, leaving edges 112 with an inconsistent and cosmetically unappealing appearance. In addition, fibers 104 may have a different color than first polymer layer 106, second polymer layer 108 and/or cosmetic layer 110, making exposed fibers 104 even more visibly apparent and exacerbating the cosmetic problem.

The techniques described herein can be used to create cosmetically clean and appealing edges 112. The techniques can be done quickly and efficiently, and are therefore well suited for use in manufacturing product lines. It should be noted that the laminated fabrics that can be used in accordance with the laser cutting techniques described here are not limited to those presented in FIG. 1. For example, a laminated fabric can include multiple fabric layers, polymer layers and/or cosmetic layers. Alternatively, a laminated fabric with only one polymer layer and one fabric layer may be used.

Figure 2A:
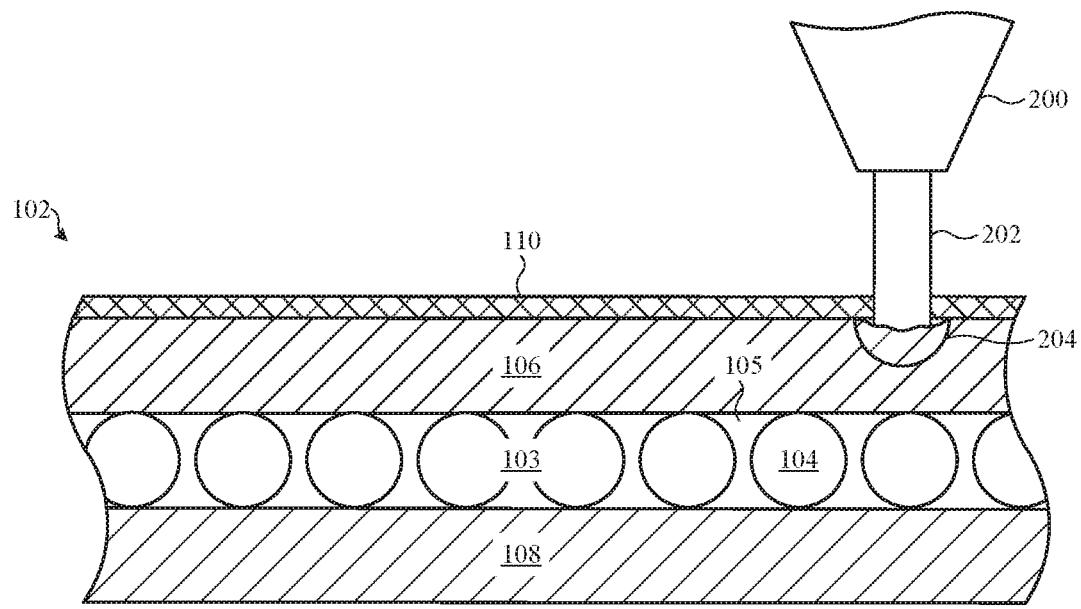
FIGS. 2A-2D shows cross section views of a laminated fabric undergoing a laser cutting process in accordance with some embodiments.

The techniques involve the use of a laser cutting operation. FIGS. 2A-2D shows cross section views of laminated fabric 102 undergoing a laser cutting process in accordance with some embodiments. FIG. 2A shows laser 200 positioned such that laser beam 202 impinges on laminated fabric 102. Laser 200 is configured to generate laser beam 202 having high enough energy to cut through cosmetic layer 110, first polymer layer 106, fabric layer 103 and second polymer layer 108. However, laser beam 202 should have a low enough energy to cause first polymer layer 106 to melt. That is, laser beam 202 should not have such a high energy so as to cleanly sever through first polymer layer 106 without also melting it. Additionally, laser beam 202 should not have such a high energy so as to cause first polymer layer 106 to splatter. Instead, laser beam 202 is of sufficiently low energy to cause pool 204 of melted polymer material from first polymer layer 106 to form at the site of laser beam 202 impingement.

The cutting operation can be continued in a stepwise fashion in which laser beam 202 periodically impinges upon an is averted from laminated fabric 102. In some embodiments, this is accomplished using laser beam 202 that is pulsed, with each pulse cutting into and laminated fabric 102 and forming a pool 204 of melted polymer material. Alternatively, laser beam 202 can be scanned over laminated fabric 102 a number of times with progressive cutting and melting each time laser beam 202 is scanned over and impinges upon laminated fabric 102. In some embodiments, a laser beam 202 is both pulsed and scanned over laminated fabric 102.

Figure 2B:
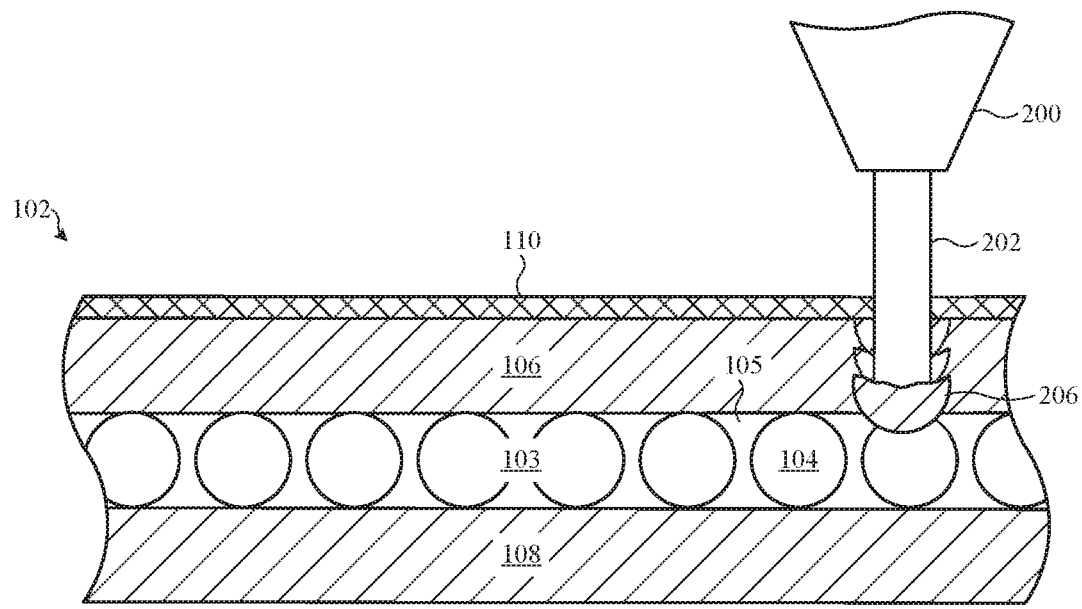

FIG. 2B shows laminated fabric 102 after laser beam 202 has completed several impingements within laminated fabric 102 such that subsequent pool 206 of melted polymer material from first polymer layer 106 is formed. The gradual stepwise cutting and melting action allows for periods of time between impingements of laser beam 202 to allow slight cooling and hardening of previously melted pools of material of first polymer layer 106. In this way, laser beam 202 gradually nibbles away at laminated fabric 102 with each passes of laser beam 202. This also can prevent splattering of melted polymer material.

Figure 2C:
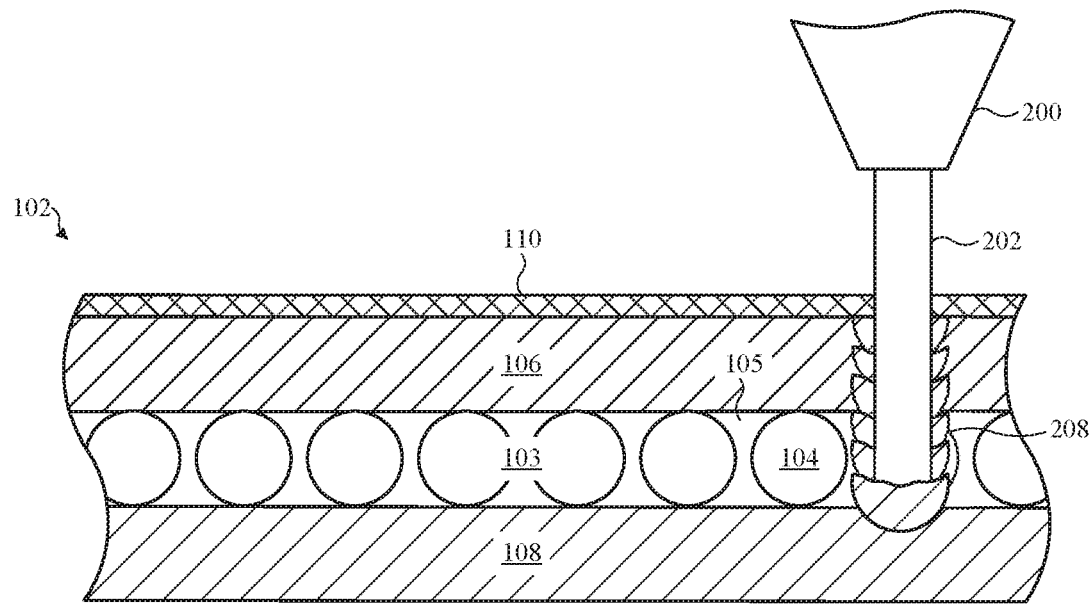

FIG. 2C shows laminated fabric 102 after laser beam 202 has passed through first polymer layer 106 and fabric layer 103 such that a series of previously melted pools of first polymer layer 106 cover fibers 104 within fabric layer 103. That is, coating 208 made of the material of first polymer layer 106 is formed over a region of fabric layer 103.

Coating 208 covers the edge of laminated fabric 102 that is being cut. Laser beam 202 can progress through second polymer layer 108 with each interaction with laser beam 202 until an entire with of laminated fabric 102 is cut, thereby completing the cutting process.

Note that when laser beam 202 cuts through second polymer layer 108, laser beam 202 can either continue the stepwise melting/cutting action. Alternatively, laser beam 202 can be switched to a continuous cutting operation or be switched to higher power in order cleanly and more quickly cut through second polymer layer 108. The latter may be chosen if it is determined to significantly save overall process time in a manufacturing situation. However, the former may be chosen if it is determined that using the stepwise melting/cutting provides a more consistent appearing coating 208 along the full edge of laminated fabric 102.

Figure 2D:
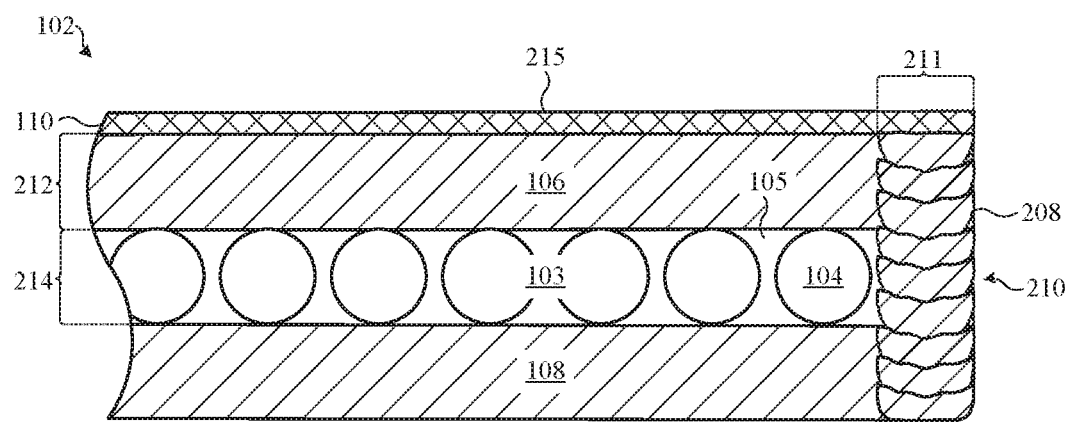

FIG. 2D shows laminated fabric 102 after completion of the laser cutting operation. Edge 210 has coating 208 that covers fabric layer 103 and prevents fibers 104 from being exposed. In this way, edge 210 appears consistent and cosmetically appealing. In a particular embodiment, first polymer layer 106 and second polymer layer 108 have a black color such that coating 208 appears as a consistent black colored polymer coating along edge 210. Thickness 211 of coating 208 can vary depending on a number of factors such as the material of first polymer layer 106, the power of laser beam 202, and the scan and/or pulse rate of laser beam 202. In some embodiments, thickness 211 of coating 208 is nominally very thin—on the order of micrometers. In some embodiments, thickness 211 is less than a millimeter, in some cases less than 50 micrometers, in some cases less than 10 micrometers.

It should be noted that the laser cutting/melting operations described herein could be performed in a single manufacturing operation. That is the stepwise laser scanning and/or pulsing can be performed at a single station with a measurable and repeatable overall time for the laser cutting/melting operation. That is, the coating process can be performed in situ or in-process with the cutting process. This is different than processes that involve a first process for cutting and a second process for coating the cut edge. This in-process cutting and coating technique can save in overall time compared to a multiple process operation.

One factor to consider when determining process parameters for implementing a particular laser cutting/melting operation includes the relationship between the effectiveness of the laser cutting/melting and the ratio of thickness 212 of first polymer layer 106 and thickness 214 of fiber layer 103. For example, if thickness 214 of fiber layer 103 is much greater than that of first polymer layer 106, it may be difficult to melt enough polymer material of first polymer layer 106 with each scan or pulse of laser beam 202 to adequately coat fiber layer 103. Thus, the thickness 212-to-thickness 214 ratio should be sufficiently high to provide adequate coverage of fiber layer 103 along edge 210.

There are some ways of compensating when the thickness 212-to-thickness 214 ratio is too low to form adequate coverage. One way is to stretch laminated fabric 102 during the laser cutting/melting operation so as to locally and temporarily reduce thickness 214 of fiber layer 103. Since fiber layer 103 is a woven material that can be more deformable than polymer layer 106, the stretching force may reduce thickness 214 of fiber layer 103 more than reducing thickness 212 of first polymer layer 106. Once coating 208 is adequately formed and allowed to cool and harden, the stretching force can be removed.

An alternative or additional way of compensating for a low thickness 212-to-thickness 214 ratio is by increasing the spot size of laser beam 202. This can be done by adjusting laser parameters such that a diameter or beam width of laser beam 202 is increased such that a greater volume of the material of first polymer layer 106 is melted with each impingement of laser beam 202. Thus, the spot size of laser beam 202 can be adjusted based on the thickness 212-to-thickness 214 ratio.

Figure 3:
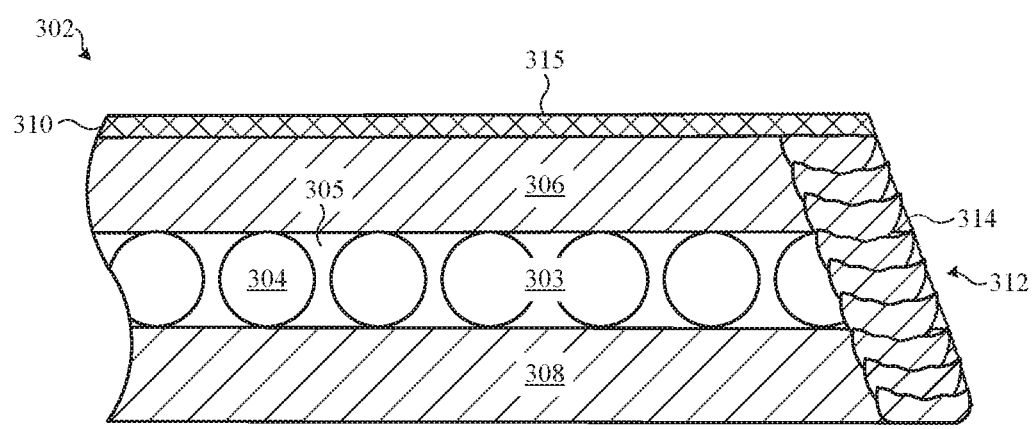
FIG. 3 shows a cross section view of a laminated fabric with a beveled edge after undergoing a laser cutting process in accordance with some embodiments.

The laser cutting/melting process shown in FIGS. 2A-2D involves laser beam 202 cutting in a direction substantially perpendicular to external surface 215 of laminated fabric 102. It should be noted, however, that laser beam 202 can alternatively be oriented at a non-perpendicular angle with respect to external surface 215 so as to form a beveled edge. This is depicted at FIG. 3 showing a cross section view of laminated fabric 302, which includes fabric layer 303 sandwiched between first polymer layer 306 and second polymer layer 308. Fabric layer 303 includes fibers 304, which is optionally embedded within matrix material 305. In some embodiments, laminated fabric 302 includes cosmetic layer 310 that covers first polymer layer 306.

Laminated fabric 302 has beveled edge 312 that is coated with coating 314. Beveled edge 312 can be formed by directing a laser beam at a non-perpendicular angle with respect to exterior surface 315 of laminated fabric 302 in a stepwise fashion similar to as described above with respect to FIGS. 2A-2D. The angle of beveled edge 312 with respect to exterior surface 315 corresponds to the angle at with the laser beam was directed to laminated fabric 302 with respect to exterior surface 315. Alternatively, beveled edge 312 can be formed using a laser beam directed in a perpendicular orientation with respect to exterior surface 315. For example, the position of the perpendicularly oriented laser beam could be shifted with each scan so as to create an overall angled cut, corresponding to beveled edge 312.

In a manufacturing setting where process cycle times can be crucial for good production through put, it may be beneficial to implement time saving measures such as cutting only certain edges of a laminated fabric using the cutting/melting techniques described above since these techniques can take more time than high powered or non-stepwise laser cutting. For example, returning to FIG. 1, only one, two or three of the four cut edges of laminated fabric 102 may be visible to a consumer. Thus, only these visible edges can be cut using the cutting/melting techniques described above, whereas remaining non-visible edges are cut using traditional cutting techniques that are faster, thereby increasing the through put of the overall laser cutting process.

Figure 4:
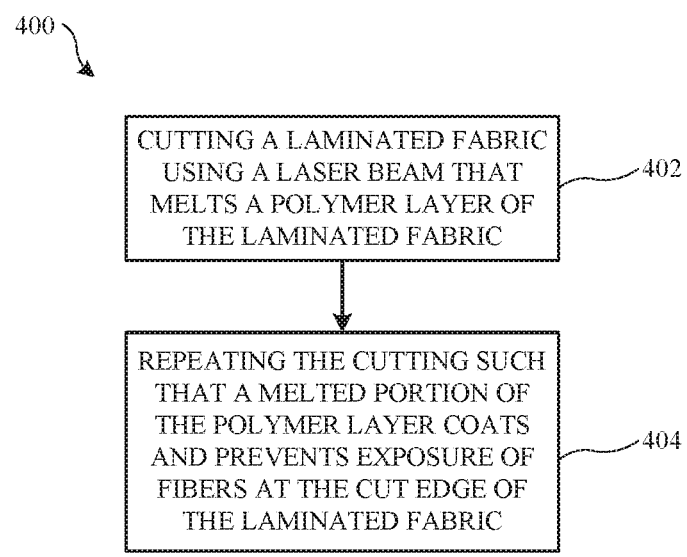
FIG. 4 shows a flowchart indicating a process for cutting a laminated fabric in accordance with some embodiments.

FIG. 4 shows flowchart 400 indicating a process for cutting a laminated fabric. The laminated fabric includes a polymer layer and a fabric layer. The fabric layer has fibers that are optionally embedded within a matrix material. The laminated fabric optionally includes at least one more polymer layers and/or one or more cosmetic layers. At 402, the laminated fabric is cut using a laser beam that melts a portion of the polymer layer. The laser beam has a high enough power to cut into a portion of the laminated fabric, in some cases ablating away portions of the laminated fabric. However, the laser power is not so high as to splatter the material of the polymer layer or cleanly pierce through the polymer layer without melting it. That is, the laser beam melts a portion of the polymer layer such that a pool of molten polymer material at least partially coats the fabric layer along the cut edge.

At 404, the laser cutting is repeated until the laser beam cuts through a width of the laminated fabric. In addition, a melted portion of the polymer material coats a final cut edge of the fabric layer, thereby preventing exposure of the fibers along the final cut edge. The repeating can involve using a stepwise process where the laser beam is impinged upon the laminated fabric a number of times. For example, a pulsed laser beam can be used to provide separated pulsed of the laser beam with short intervals of time between the pulses for the melted polymer material to cool and partially harden. Alternatively or additionally, the laser beam can be scanned over the laminated fabric a number of times such that the laminated fabric is cut and melted with each scan. The melted polymer material can cool and partially harden in periods between each pulse or scan.

After the laser cutting/melting process is complete, the cut edge has a polymer coating that covers the fibers and provides a consistent and continuous appearance. In some embodiments, the laser cutting process is used to form a straight (i.e., perpendicular edge), while in other embodiments the laser cutting process is used to form a beveled edge. The laser cutting process can cut all or some of the edges of a final laminated fabric piece.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of forming a cosmetic edge on a laminated fabric, the laminated fabric including a polymer layer and an attached fabric layer, the fabric layer including fibers, the method comprising:
    cutting an edge of the laminated fabric by directing a laser beam at the polymer layer and the attached fabric layer, wherein during the cutting:
    the laser beam melts a portion of the polymer layer forming a pool of melted polymer material, wherein the pool of melted polymer material coats the fibers along the edge so as to prevent exposure of the fibers along the edge.

2. The method of claim 1, wherein cutting the edge comprises using a pulsed laser beam that impinges the laminated fabric a plurality of times.

3. The method of claim 1, wherein cutting the edge comprises scanning the laser beam over the laminated fabric a plurality of times.

4. The method of claim 1, wherein cutting the edge and melting the portion of the polymer layer occurs using a single laser operation.

5. The method of claim 1, wherein the laminated fabric includes a plurality of polymer layers and wherein the fabric layer is positioned between at least two of the plurality of polymer layers.

6. The method of claim 1, wherein the polymer layer includes at least one of polyurethane, epoxy, acrylic, polyester and a polyimide.

7. The method of claim 1, wherein the fibers include at least one of polymer-based fibers, carbon fibers and glass fibers.

8. The method of claim 1, wherein the cut edge is a beveled edge.

9. A method of cutting a laminated fabric, the laminated fabric including a polymer layer and a fabric layer, the fabric layer having fibers, the method comprising:
    impinging a laser beam on the laminated fabric such that the laser beam cuts the laminated fabric, wherein the laser beam locally heats the polymer layer forming a pool of melted material that completely coats a cut edge of the fabric layer; and
    repeating the impinging until the laser beam cuts through a width of the laminated fabric such that a final cut edge of the laminated fabric has a coating that completely covers the fabric layer and the fibers along the final cut edge.

10. The method of claim 9, wherein repeating the impinging comprises using a pulsed laser beam that impinges the laminated fabric a plurality of times.

11. The method of claim 9, wherein repeating the impinging comprises scanning the laser beam over the laminated fabric a plurality of times.

12. The method of claim 9, wherein repeating the impinging comprises stepwise cutting the laminated fabric and melting the polymer layer in a single laser operation.

13. The method of claim 9, wherein the pool of melted material cools and at least partially hardens prior to repeating the impinging.

* * * * *